United States Patent
Cretti

[19]

[11] Patent Number: 6,045,350
[45] Date of Patent: *Apr. 4, 2000

[54] ADJUSTABLE WALL APPARATUS FOR MOLDING A CONTINUOUS FOAMED PLASTICS ELEMENT

[75] Inventor: Piero Cretti, Ticino, Switzerland

[73] Assignee: Plastedil S.A., Chiasso, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/985,243

[22] Filed: Dec. 4, 1997

[30] Foreign Application Priority Data

Dec. 5, 1996 [IT] Italy ................... MI96A2557

[51] Int. Cl.$^7$ ................................ B28B 5/00
[52] U.S. Cl. ............. 425/364 R; 425/4 C; 425/817 C
[58] Field of Search ................. 264/45.8; 425/4 C, 425/817 C, 364 R

[56] References Cited

U.S. PATENT DOCUMENTS

| | | | |
|---|---|---|---|
| 3,639,550 | 2/1972 | Darmochwal | 425/4 C |
| 3,702,747 | 11/1972 | Porter et al. | 425/4 C |
| 4,043,719 | 8/1977 | Jones | 425/817 C |
| 4,152,385 | 5/1979 | Tabler | 425/817 C |
| 4,267,135 | 5/1981 | Stroud et al. | 425/817 C |
| 4,312,822 | 1/1982 | Bonnet | 264/45.8 |
| 4,395,214 | 7/1983 | Phipps et al. | 425/817 C |
| 4,456,443 | 6/1984 | Rabotski | 425/4 R |
| 4,505,662 | 3/1985 | Hay, II | 425/817 C |
| 4,588,541 | 5/1986 | Fowler | 425/817 C |
| 4,756,859 | 7/1988 | Cretti | 425/4 C |
| 5,340,300 | 8/1994 | Saeki et al. | 425/817 C |
| 5,393,361 | 2/1995 | Bareuter et al. | 264/45.8 |
| 5,792,481 | 8/1998 | Cretti | 264/45.8 |
| 5,798,064 | 8/1998 | Peterson | 425/817 C |

FOREIGN PATENT DOCUMENTS 26 32 302 1/1978 Germany ................ 425/817 C

Primary Examiner—Allan R. Kuhns
Attorney, Agent, or Firm—Whitham, Curtis & Whitham

[57] ABSTRACT

An apparatus for molding a continuous foamed plastics element (2), such as a floor construction member of the type comprising a substantially parallelepipedic central body (3) and at least one lateral projection (5,6), includes a mold (13) comprising a forming chamber (13a) and a stabilization chamber (13b) defined between a bottom wall (22), a pair of opposite side walls (20,21), and a cover (23). Advantageously, the cover (23) and/or one or both the side walls (20,21) of the mold (13) comprise a plurality of structurally independent segments which may be adjustably positioned toward and away from the bottom wall (22) of the mold (13) for independently adjusting, in a substantially continuous manner, the height of the molding seats of the central body (3) and/or of the lateral projection (5,6) of the continuous element (2) in each of the forming (13a) and stabilization (13b) chambers of the mold (13).

31 Claims, 14 Drawing Sheets

ADJUSTABLE WALL APPARATUS FOR MOLDING A CONTINUOUS FOAMED PLASTICS ELEMENT

BACKGROUND OF THE INVENTION

1. Field of the Invention

In a general aspect, the present invention relates to an apparatus for molding a continuous element of foamed plastics.

The present invention relates, more particularly, to an apparatus for molding a continuous element of foamed plastics which finds a preferred, although not exclusive use, as a construction member in the building industry.

2. Background of the Invention

In the following description and the subsequent claims, the term: "continuous foamed plastic element" is used to indicate a foamed plastic section bar, e.g. made of foamed polystyrene, which leaves the molding apparatus as a single piece substantially free from joints or breaks and having indefinite length.

As is known, in the field of building construction in general, the use has long enjoyed success of foamed plastic construction elements, preferably made of foamed polystyrene, in the form of sheets or section bars of appropriate shape and size, having the function of thermal and acoustic insulating material.

According to the most widespread known technique, such as for example that described in Italian patent n. 1,051,111 filed by the same Applicant, the construction elements of the type considered are obtained by cutting in pieces of predetermined length a continuous element produced by means of molding apparatuses comprising a mold in which a molding seat is defined having a shape mating that of the continuous element to be produced.

In each molding cycle, a metered quantity of expandable plastic material in granules is fed into the above mentioned seat and subjected to expansion with a mutual welding of the granules through the action of heat, so as to form a new portion of the continuous element and obtain its simultaneous welding with an adjacent portion formed in a preceding molding cycle.

At the end of the molding and subsequent stabilization operations, the mold is opened and the continuous element incorporating the new portion is made to advance by a distance corresponding to the length of the molding seat, so as to arrange the latter for receiving other granules and initiating a new production cycle.

In this manner, a continuous foamed plastic element of indefinite length is obtained by means of successive molding operations, which element may be subsequently cut in portions of definite length that may be chosen at will.

Although substantially meeting the purpose, the molding apparatus of the prior art displays poor operating flexibility and, more specifically, does not allow an easy control of the shape, and in particular of the height, of the continuous foamed plastic element where required.

Thus, for example, each time it is desired to change the height of the element to confer improved mechanical strength thereto, the prior art proposes to change the height of the molding seat defined in the mold, by inserting spacers of adequate thickness into the cover each time as needed.

Consequently, there is not only the need to stop the molding operations for adapting the mold, but also the need to keep in storage a set of spacers of different lengths to perform the desired adjustment as required.

It goes without saying that in addition to an undesired capital locking-up, such an 'adjustment' may not in fact allow the production of elements having heights different from that predefined by the thickness of the available spacers.

This technique, furthermore, is very difficult if not impossible to apply each time it is desired to adjust the height of any lateral projections present in the continuous element, such as for example in the case of the so-called floor elements, when it is desired to impart to these elements improved thermal and acoustic insulation characteristics.

The drawbacks mentioned above, furthermore, become even more stringent whenever the continuous foamed plastics element incorporates metal reinforcing members, as described, for example, in European Patent EP 0 459 924. In this case, in fact, it is necessary to cut the metal members upstream of the molding apparatus, to remove the element molded during the previous molding cycle from the molding seat, to insert again the metal members into the molding seat, to place appropriate spacers and to close the mold outlet with a stopper, before the molding operations may be started again.

This is clearly a cumbersome and time-consuming procedure that unfavorably affects the efficiency of the molding cycle, as well as producing a not negligible waste of material.

SUMMARY OF THE INVENTION

The technical problem underlying the present invention is therefore that of providing an apparatus for molding a continuous foamed plastic element capable of overcoming the above-mentioned drawbacks of the prior art.

According to a first aspect of the present invention, this problem is solved by an apparatus for molding a continuous foamed plastic element comprising a mold including:

i) a bottom wall, a pair of opposite side walls, and a cover;

ii) a forming chamber and a stabilization chamber of said continuous element, said chambers being defined inside the mold between said side walls, said bottom wall and said cover;

wherein said cover comprises a plurality of structurally independent segments, means being provided for positioning in an adjustable manner each of said independent segments of the cover toward and away from the bottom wall of the mold so as to regulate in an independent, adjustable and substantially continuous manner the height of the forming and stabilization chambers of the mold.

In a preferred embodiment of the invention, the mold cover comprises a pair of segments longitudinally spanning along the full length of the forming chamber and, respectively, of the stabilization chamber.

Advantageously, the height of each of said forming and stabilization chambers of the foamed plastics element may be independently adjusted in a substantially continuous manner between minimum and maximum values which are preset at the design stage, by means of at least one power driven jack arranged to act on each of the independent cover segments.

Preferably, the means adapted for positioning in an adjustable manner each of the independent cover segments comprises a plurality of jacks kinematically connected together by means of a shaft which is rotated by suitable motor means.

In this case, an adequate parallelism of upward/downward motion may be ensured for each of the independent cover segments toward and away from the bottom wall of the mold.

Preferably, the apparatus of the invention further comprises means for clamping together the independent cover segments, so as to provide an adequate fluid-tight closure during the molding operations.

In a preferred embodiment, such means comprises a plurality of Belleville washers mounted on one of the independent segments of the cover and acting thereon to hold the same pressed against the adjacent segment.

To ensure an adequate fluid-tight seal for the cover, furthermore, the apparatus of the invention preferably comprises a sealing plate interposed between the independent segments that make up the cover. Preferably, this sealing plate is attached to an end wall of one of the segments such as, but not necessarily, the segment carrying the Belleville washers.

Advantageously, the sealing plate outer surface is lined with a suitable self-lubricating material for smoother sliding movements of the cover segments along the vertical direction, and to preserve the surface integrity of the side walls of the segments constantly held in mutual contact.

According to a second aspect of the invention, the aforementioned technical problem is solved by an apparatus for molding a continuous foamed plastics element of the type comprising a substantially parallelepipedic central body and at least one projection laterally and longitudinally extending from said body, said apparatus including a mold comprising:
  i) a bottom wall, a plurality of opposite side walls, and a cover;
  ii) a forming chamber and a stabilization chamber of said continuous element, said chambers being defined inside the mold between said side walls, said bottom wall and said cover;
  iii) a first molding seat of the central body of said continuous element defined within said forming and stabilization chambers of the mold;
  iv) a second molding seat of said at least one lateral projection of the continuous element defined within the forming and stabilization chambers of the mold between a groove formed in at least one of said side walls and said bottom wall;
wherein said at least one side wall comprises a plurality of structurally independent segments, means being provided for positioning in an adjustable manner each of the independent segments of said at least one side wall toward and away from the bottom wall of the mold so as to regulate in an independent, adjustable and substantially continuous manner the height of the second molding seat defined within said forming and stabilization chambers of the mold.

In a preferred embodiment of the invention, at least one, better still both, of the side walls of the mold comprise a pair of segments longitudinally extending along the length of the forming chamber and, respectively, of the stabilization chamber of the mold.

In a similar manner to the previously described embodiment of the invention, the height of each molding seat wherein the lateral projection of the foamed plastics element is formed is preferably adjusted in an independent and substantially continuous manner between minimum and maximum values which are preset at the design stage, by means of at least one power driven jack acting on each of the independent segments of the side wall.

Preferably, each of the independent segments of the side wall—defining together with the bottom wall of the mold the second molding seat of the lateral projection—is provided with a plurality of jacks kinematically connected by means of a shaft which is rotated by suitable motor means.

In this case, an adequate parallelism of upward/downward motion may be ensured for each of the independent segments of the side wall toward and away from the bottom wall of the mold.

Preferably, the apparatus of the present invention further comprises means for clamping together the independent segments of the side wall, so as to provide an adequate fluid-tight closure during the molding operations.

In a preferred embodiment, such means comprises a plurality of Belleville washers mounted on one of the independent segments of the side wall and acting on that segment to hold it pressed against the adjacent segment.

To ensure a fluid-tight seal of the side wall, furthermore, the apparatus of the invention preferably comprises a sealing plate interposed between said independent segments of the side wall. Preferably, this sealing plate is fixed to an end wall of one of the segments such as, but not necessarily, the segment carrying the Belleville washers.

Advantageously, the sealing plate is lined on its outer surface with a suitable self-lubricating material for smoother sliding movements of the side wall segments along the vertical direction, as well as to preserve the surface integrity of the side walls of the segments constantly held in mutual contact.

According to a third aspect of the invention, the aforementioned technical problem is solved by an apparatus for continuously molding a foamed plastics element as previously indicated, said apparatus including a mold comprising:
  i) a bottom wall, a plurality of opposite side walls, and a cover;
  ii) a forming chamber and a stabilization chamber of said continuous element, said chambers being defined inside the mold between said side walls, said bottom wall and said cover;
  iii) a first molding seat of the central body of said continuous element defined within said forming and stabilization chambers of the mold;
  iv) a second molding seat of said at least one lateral projection of the continuous element defined within the forming and stabilization chambers of the mold between a groove formed in at least one of said side walls and said bottom wall;
wherein said cover and at least one of said side walls of the mold comprise a plurality of structurally independent segments, first and second means being provided for independently positioning in an adjustable manner each of the independent segments of the cover and of said at least one side wall toward and away from the bottom wall of the mold so as to regulate in an independent, adjustable and substantially continuous manner the height of said first molding seat and, respectively, of said second molding seat defined in said forming and stabilization chambers of the mold.

Advantageously, the height of the first molding seat of the foamed plastics element—or at least its overall height—may in this case be adjusted simultaneously and independently of the height of the molding seat defining its lateral projections, both in the forming chamber and in the stabilization chamber of the mold.

It will be appreciated that, in this third embodiment of the invention, the structural features of the cover and side walls of the mold are quite similar to those of the previously described embodiments.

Further features and advantages of the invention will be more clearly apparent from the following description of a preferred embodiment of an apparatus according to the invention for continuously molding a foamed plastics element, given by way of example and not of limitation with reference to the accompanying drawings.

DETAILED DESCRIPTION OF A PREFERRED EMBODIMENT OF THE INVENTION

Figure 1:
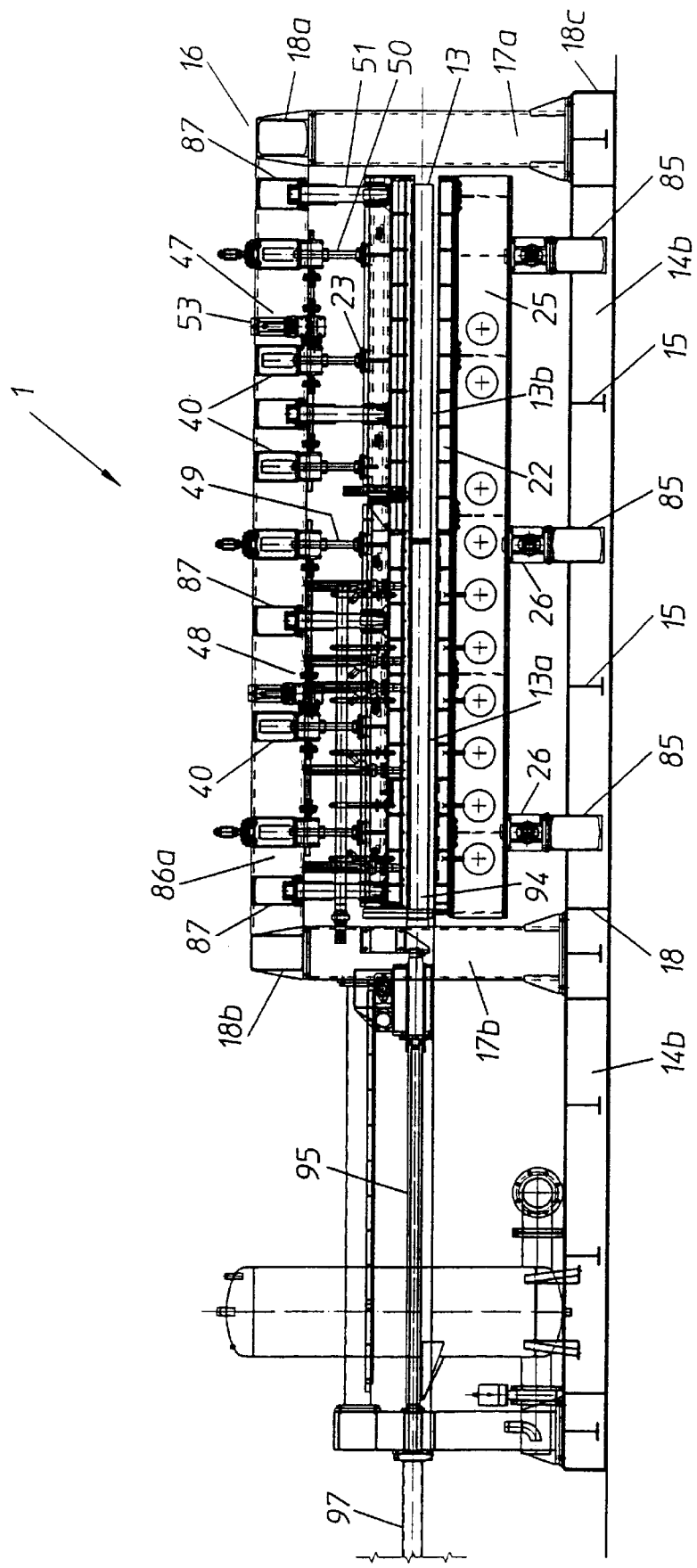
FIG. 1 is a lateral elevation view, partly in longitudinal cross section taken along line I—I of FIG. 3, of an apparatus according to the invention for molding a continuous foamed plastics element.

Referring to the drawing figures, generally shown at 1 is an apparatus according to the invention for molding a continuous foamed plastics element, such as a continuous element 2 for use in the construction of building floors.

In the example shown, the element 2 comprises a body 3, wherein a plurality of longitudinal parallel cavities 4 are defined, and a pair of projections 5, 6 laterally and longitudinally extending along opposite sides of the body 3. The continuous element 2 incorporates two reinforcing sectional members 7, 8, structurally identical with one another, embedded in mirror-image relationship with respect to a longitudinal plane of symmetry of the element and longitudinally extending in the central body 3 along substantially the full length of the continuous element 2.

In a preferred embodiment, the reinforcing sectional members 7, 8 are formed by suitably shaping a cold-rolled zinc-galvanized metal sheet by means of apparatuses known per se.

The reinforcing sectional members 7, 8, furthermore, are substantially Z-shaped and comprise a central portion 9 and a pair of respectively lower and upper fins 11, 12 perpendicularly extending along opposite directions from the ends of the central portion 10.

According to the invention, the continuous element 2 further comprises a wire lath 12, for supporting at least one layer of a suitable covering material, such as plaster, welded to the lower fins 10 of the reinforcing sectional members 7, 8.

Figure 9:
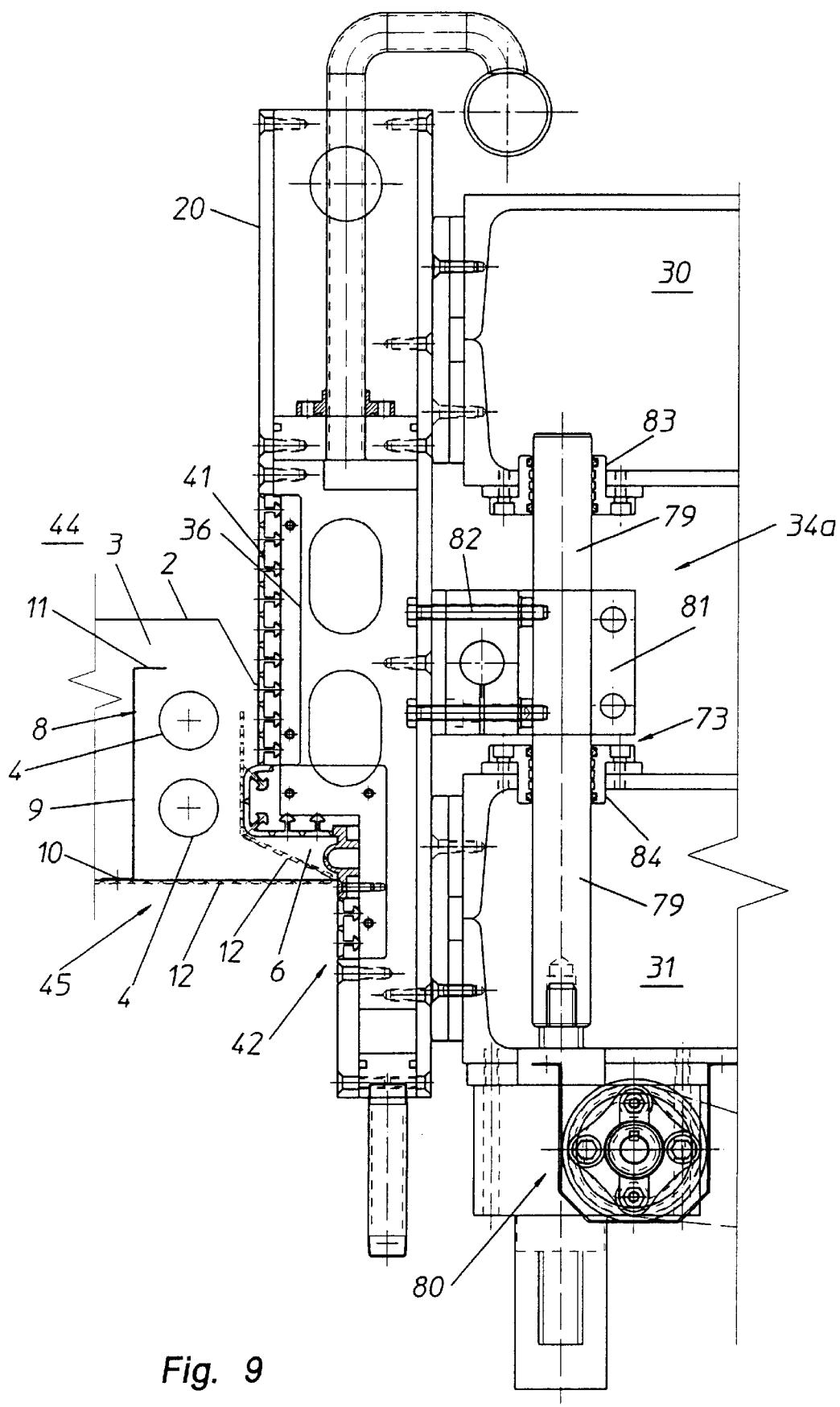
FIGS. 9 and 10 are enlarged views, partly in transversal cross-section, respectively showing certain details of the side walls of the mold of the apparatus of FIG. 1 in different operating condition thereof.
Figure 10:
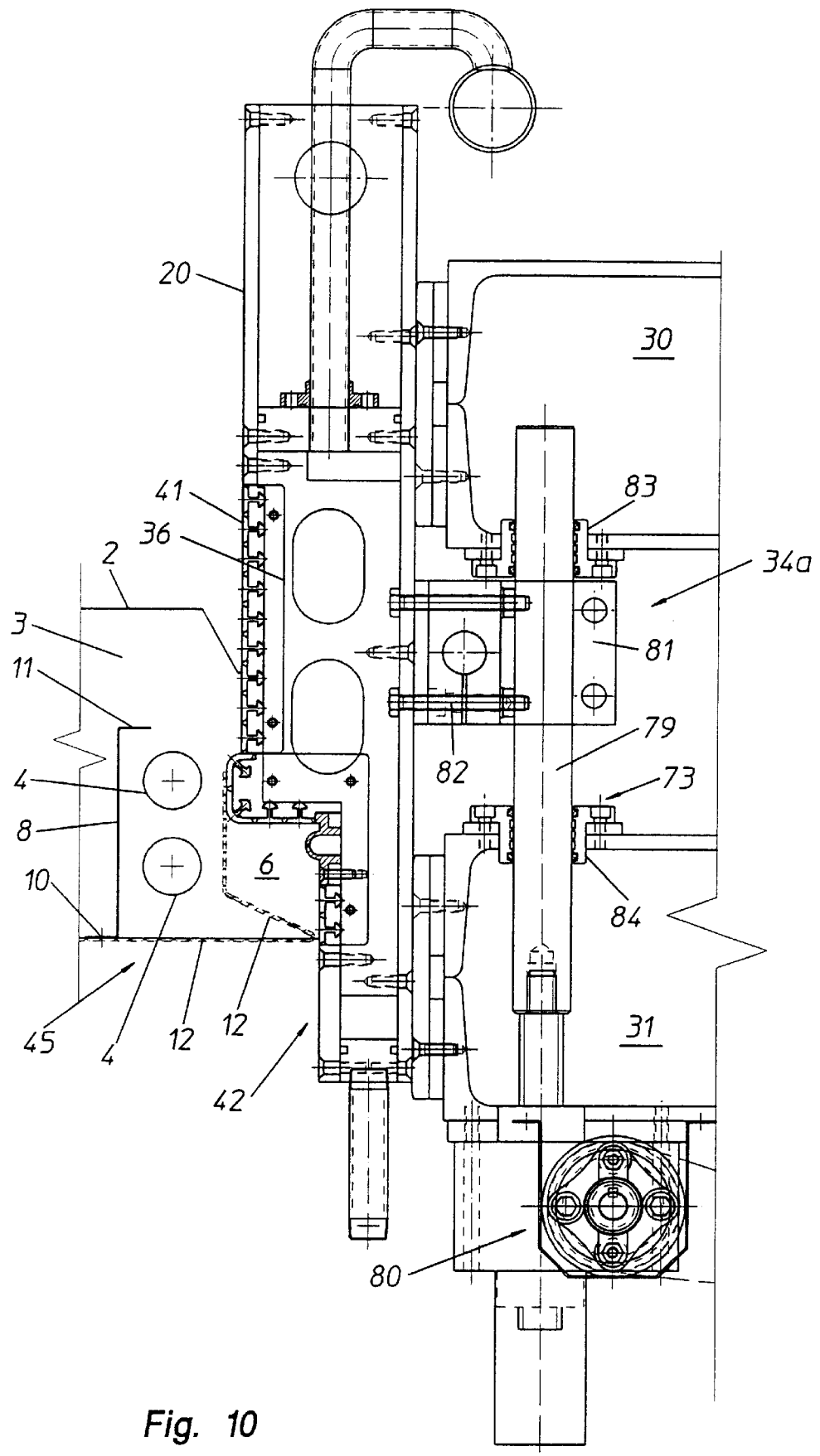
Figure 11:
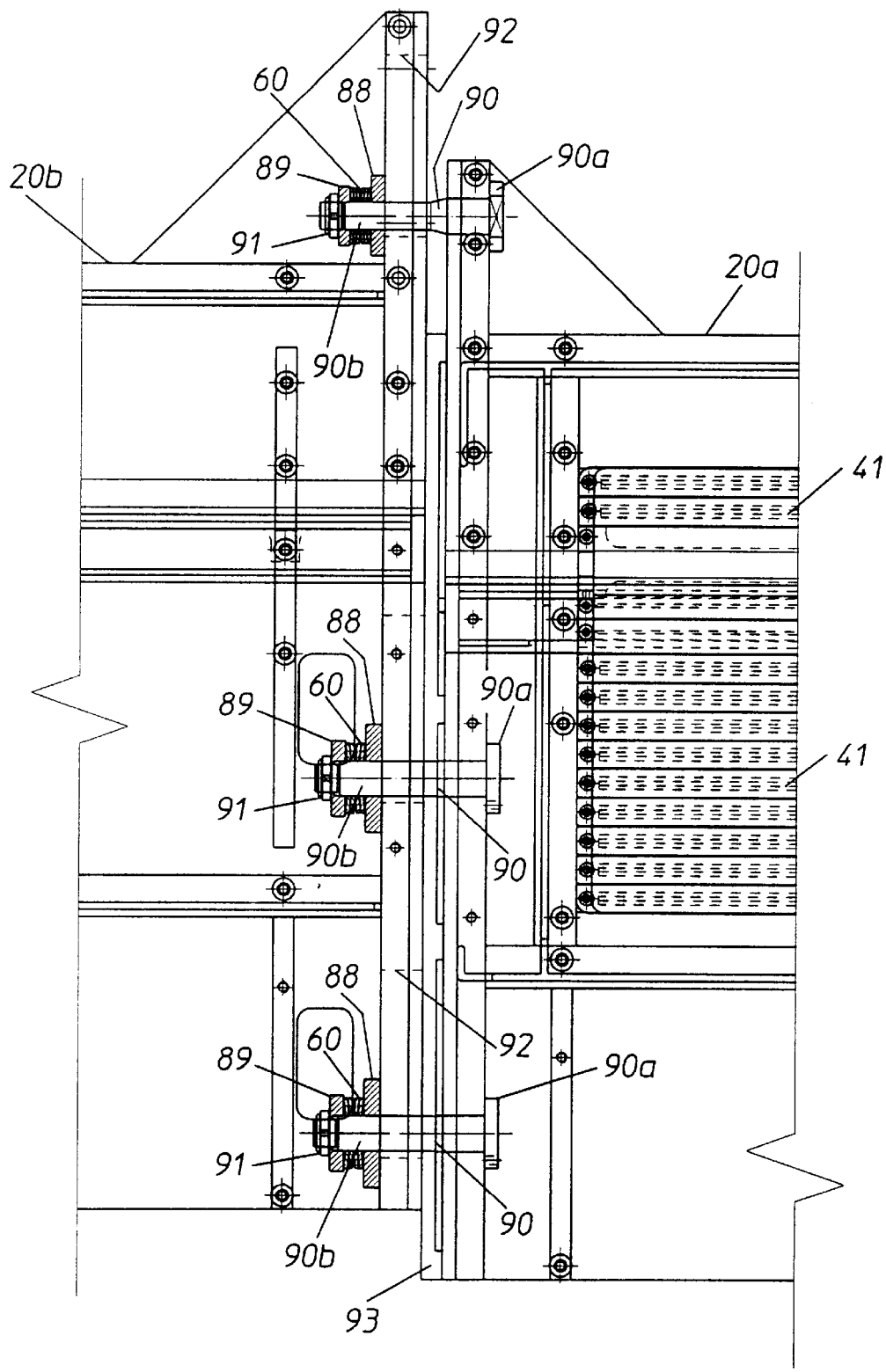
FIGS. 11 and 12 are enlarged views, partly in longitudinal cross section, respectively showing certain details of the side walls of the mold of the apparatus of FIG. 1 in different operating condition thereof.
Figure 14:
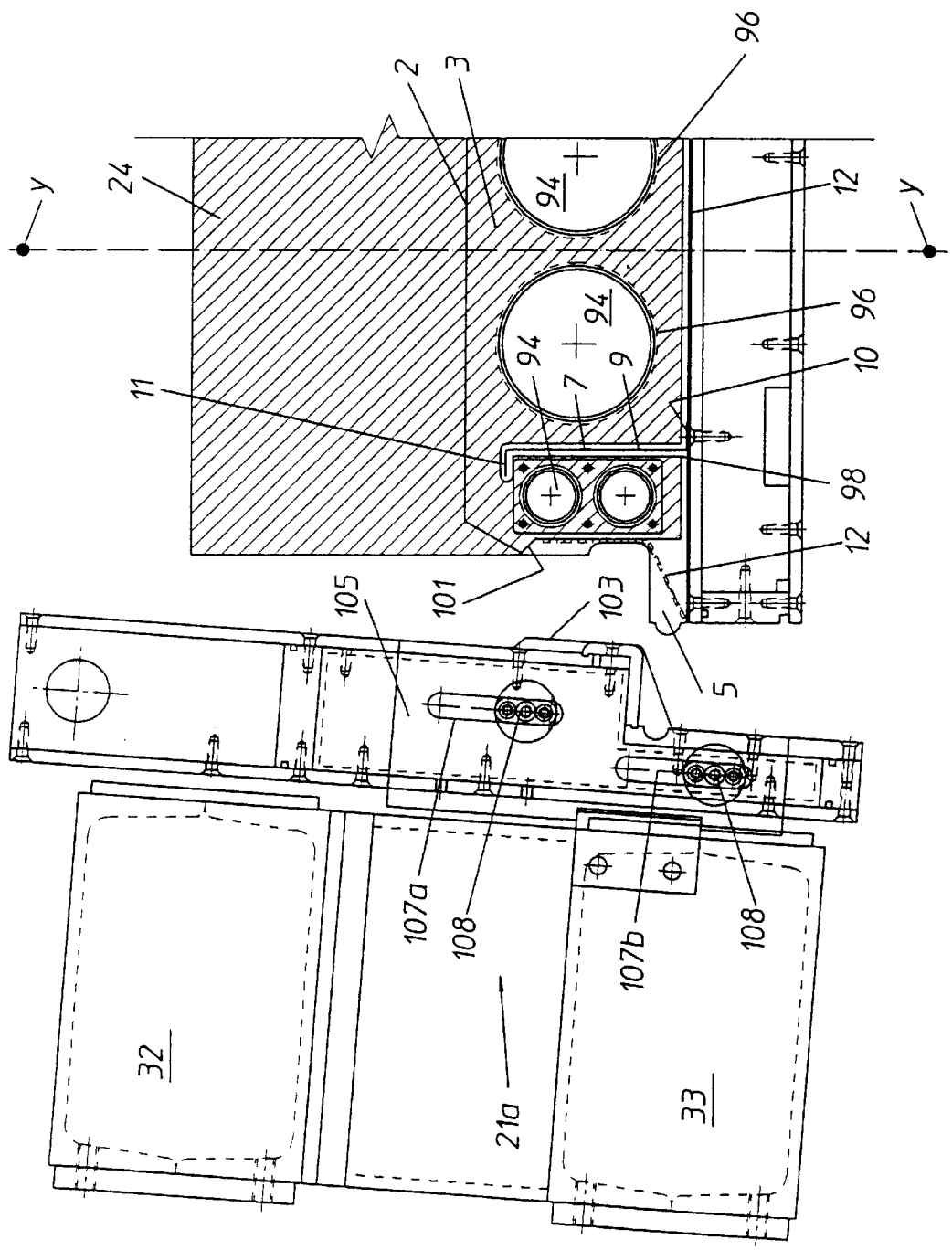
FIG. 14 is an enlarged view, partly in transversal cross-section, of the same details of FIG. 13 in a different operating condition of the apparatus shown in FIG. 1.

As shown in FIGS. 9, 10 and 14, the fins 10 lie substantially flush with and substantially parallel to the lower face of the continuous element 2.

The lath 12 is suitably folded at its opposite side ends to form a first oblique lath section fully embedded in the projections 5, 6, and a second lath section extending in a substantially vertical direction partly flush with the opposite lateral sides of the continuous element 2.

Figure 3:
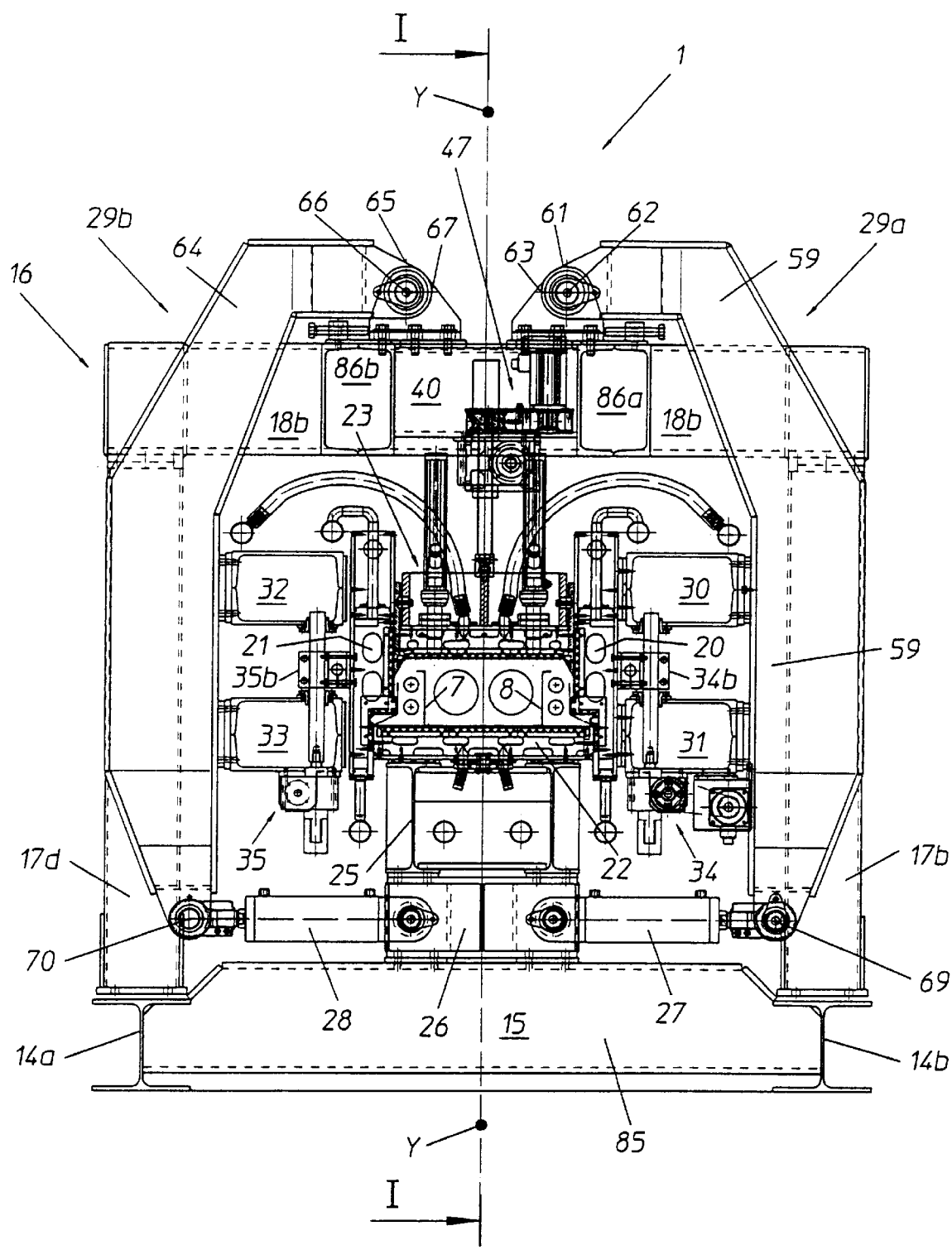
FIG. 3 is a cross-sectional view taken along line III—III of FIG. 2, of the apparatus of the invention in a first operating condition thereof.
Figure 4:
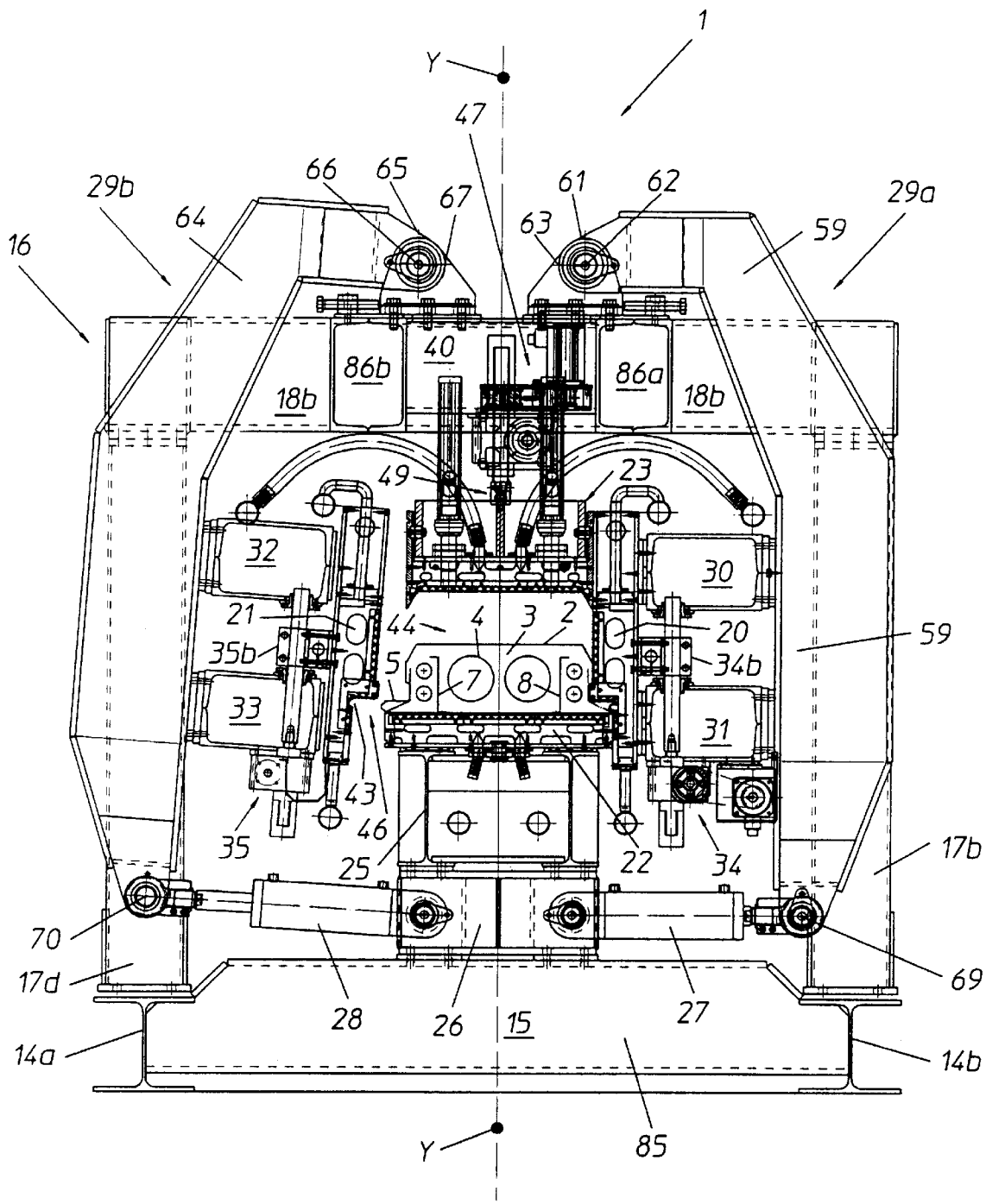
FIG. 4 is a cross-sectional view taken along line III—III of FIG. 2, of the apparatus of the invention in a second operating condition thereof.

The apparatus 1 includes a mold 13 mounted on a supporting structure which comprises a pair of parallel beams 14a, 14b spaced apart from each other and stiffened by a plurality of beams 15 (FIGS. 3 and 4).

The beams 14a, 14b support a substantially cage-like structure, generally denoted by 16, which comprises two pairs of uprights 17a–17b and 17c–17d parallel to each other and symmetrically extending on opposite sides of the apparatus 1.

Figure 5:
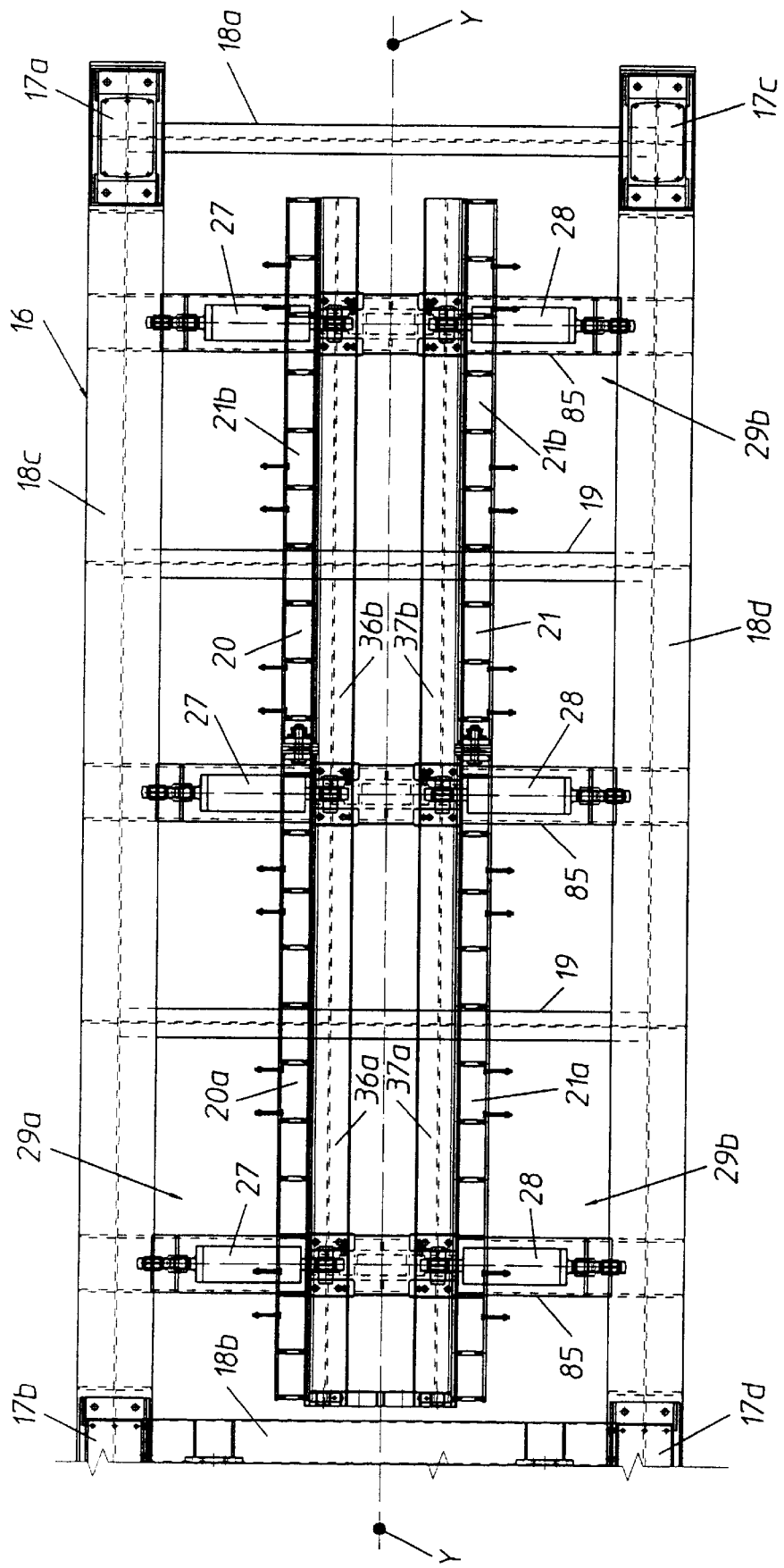
FIG. 5 is a top view of certain details of the supporting structure and the mold of the apparatus shown in FIG. 1.
Figure 6:
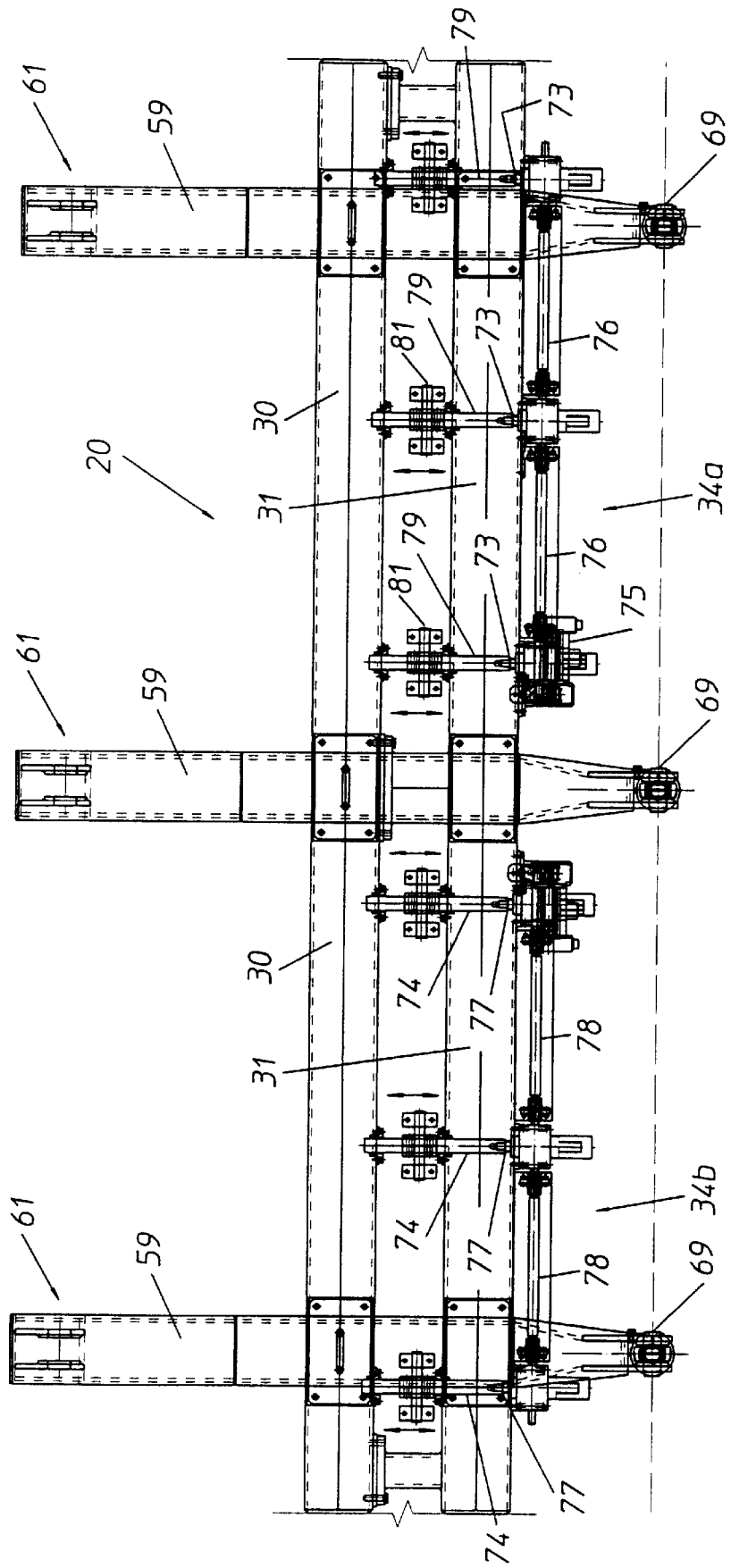
FIG. 6 is a lateral view of certain details of one of the side walls of the mold of the apparatus shown in FIG. 1.

The uprights of each of said pairs 17a–17b and 17c–17d are reciprocally spaced apart and stiffened by respective pairs of crosspieces 18a–18b and longitudinal beams 18c–18d extending transversely and, respectively, parallel to the mold 13 (FIG. 5).

To further strengthen and stiffen the cage-like structure 16, a plurality of beams 19—pitchwise spaced from one another—join the crosspieces 18a and 18b together, perpendicularly to the mold 13.

The mold 13 of the molding apparatus 1 essentially comprises a pair of opposite parallel side walls 20, 21, a bottom wall 22, and a cover 23 defining—in cooperation with a vertical closure plate 24 supported at a rear end of the mold 13—a substantially tunnel-shaped molding seat having a shape mating that of the element 2.

The mold 13, furthermore, is divided, as more clearly explained hereinafter, into a rear chamber 13a intended for forming a segment of predetermined length of the element 2 by expanding the plastic material in granules, and a front chamber 13b adjacent to the rear chamber and designed to allow a shape stabilization of the segment formed during a previous molding cycle.

Throughout the following description and the appended claims, the terms: "front" and "rear" are used to indicate those parts and accessories of the apparatus 1 which are located at the open portion of the mold 13 adapted to withdraw the element and, respectively, at the closed portion of the mold wherein the plastics granules are loaded for molding.

In the apparatus 1, the closure plate 24 posteriorly closes the forming seat defined in the chamber 13a of the mold 13, and is preferably lined with a grooved self-lubricating sheet, e.g. of polytetrafluoroethylene, adapted to form a corresponding grooved surface of mating shape on one end of the element 2.

This grooved surface allows to optimize the reciprocal welding between adjacent segments of the element 2 as they are molded by the apparatus 1 during successive molding cycles.

Figure 2:
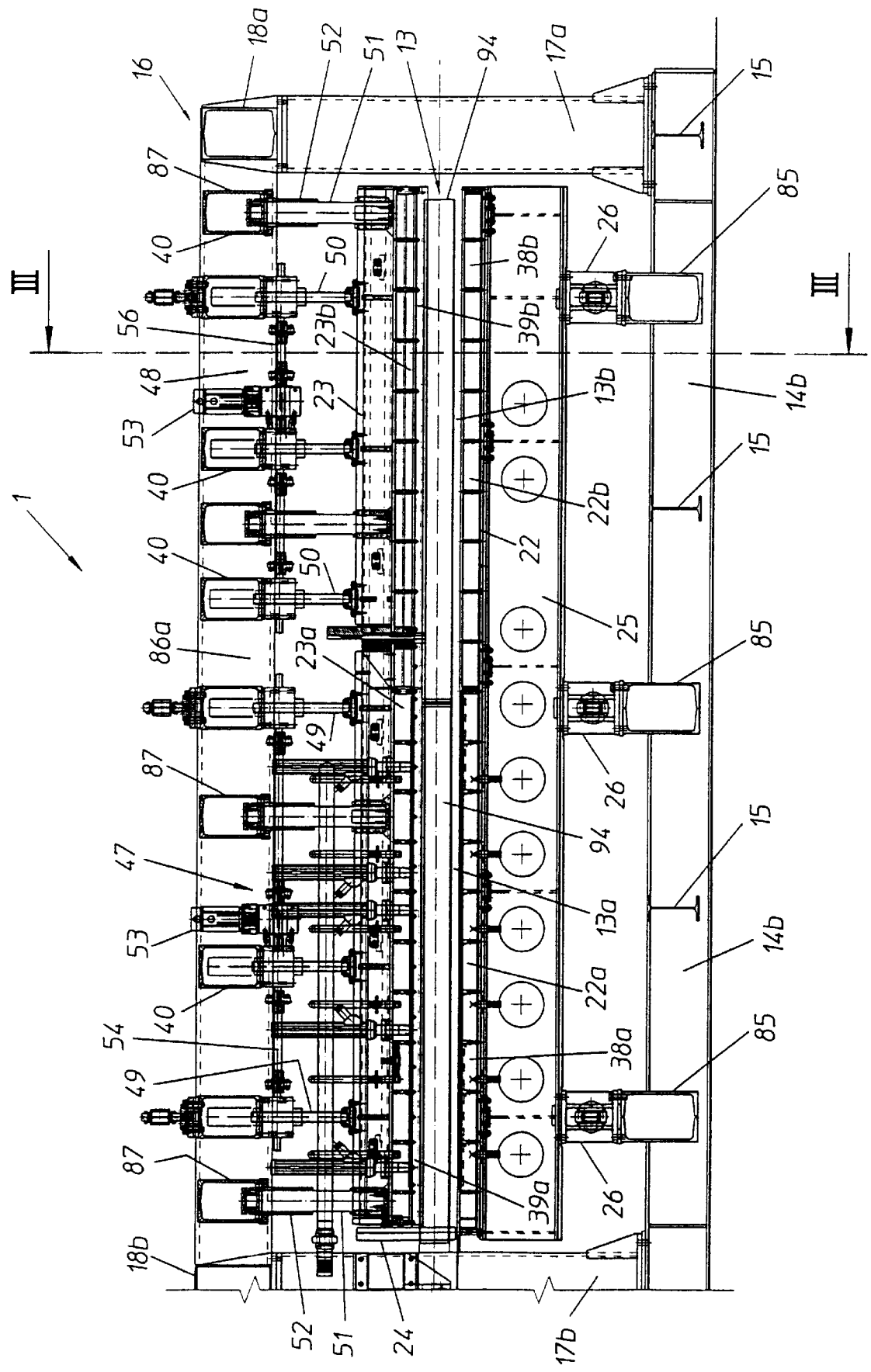
FIG. 2 is an enlarged lateral elevation view, partly in longitudinal cross section taken along line I—I of FIG. 3, showing certain details of the apparatus illustrated in FIG. 1.

The bottom wall 22 of the mold 13 is supported by a base 25, also having an essentially cage-like structure, which bears on a plurality of beams 26 extending crosswise to the mold 13 and supported in turn by a plurality of box-like supporting members 85 (FIGS. 1 and 2).

Each beam 26 also pivotally supports, on opposite sides thereof, two double-acting hydraulic cylinders, denoted by 27 and 28, which are parts of oppositely located devices 29a, 29b for laterally opening the side walls 20 and, respectively, 21 which will be described in more detail hereinbelow.

In a preferred embodiment of the invention, the side walls 20 and 21, the bottom wall 22, and the cover 23 of the mold 13 essentially consist of a pair of segments longitudinally extending along the length of the forming chamber 13*a* and, respectively, of the stabilization chamber 13*b* of the mold 13.

Throughout the following description and in the accompanying drawings, these independent segments will be indicated by the references 20*a*–20*b* and 21*a*–21*b* for the side walls 20 and 21; 22*a*–22*b* for the bottom wall 22; and 23*a*–23*b* for the cover 23.

Each of said independent segments essentially consists of a hollow box-type body, wherein a chamber is defined which is fed, in suitable sequential order, by appropriate fluids (usually steam, cooling water and compressed air) for heating and cooling the segment of the element 2 being molded.

Throughout the following description and in the drawings, these chambers will be indicated by the references 36*a*, 36*b* for the segments 20*a* and 20*b* of the side wall 20; 37*a*, 37*b* for the segments 21*a* and 21*b* of the side wall 21; 38*a*, 38*b* for the segments 22*a* and 22*b* of the bottom wall 22; and 39*a*, 39*b* for the segments 23*a* and 23*b* of the cover 23.

In order to feed said heating and cooling fluids into the forming and stabilization chambers 13*a*, 13*b* of the mold 13, the inner wall of each of said segments is provided with a plurality of slits, collectively denoted by 41 (FIGS. 9 and 10). Each of the segments 20*a*–20*b* and 21*a*–21*b* of the side walls 20 and 21 of the mold 13 is provided in the embodiment shown with a substantially L-shaped groove which longitudinally spans along the full length thereof.

In FIGS. 4 and 9–10, only the grooves 42 and 43 formed in the segments 20*b* and 21*b* of the opposite walls 20 and 21 are shown, it being understood that the grooves formed in the other segments of such walls are structurally identical.

These grooves have predetermined height and depth, defined at the design stage as a function of the particular shape to be conferred to the lateral projections 5, 6 of the element 2.

Thanks to the peculiar shape of the side walls 20 and 21 of the mold 13, therefore, inside the latter and within each of said forming and stabilization chambers 13*a*, 13*b*, a first molding seat 44 of the central body 3 of the foamed plastics element 2 and opposite second molding seats 45, 46 of the lateral projections 5 and 6, are defined.

More specifically, the second molding seats 45, 46 are defined between the L-shaped grooves formed in each segment of the side walls 20, 21 and the bottom wall 22 of the mold 13.

The apparatus 1 of the example shown is provided with suitable means for displacing the cover 23 toward and away from the bottom wall 22, to longitudinally close and, respectively, open the mold 13.

More particularly, said means comprises a pair of actuators 47, 48 adapted to displace the rear segment 23*a* and, respectively, the front segment 23*b* of the cover 23.

The actuators 47, 48 comprise three jacks, respectively denoted by references 49 and 50, pitchwise spaced from one another so as to allow an adequate parallelism of upward/downward motion of the cover 23.

In the embodiment shown, each of the jacks 49 and 50 is supported by a supporting beam 40, extending crosswise to the mold 13, the opposite ends of which are fixed to a pair of longitudinal girders 86*a*, 86*b*.

The latter are conventionally fixed to the front and rear crosspieces 18*a*, 18*b* of the cage-like structure 16 and extend parallel to the longitudinal beams 18*c* and 18*d*.

Preferably, the parallelism of upward/downward motion of the cover 23 is also ensured by a plurality of cylindrical rods 51, attached to the cover segments 23*a*, 23*b*, which are slidably engaged in respective bushes 52 fixed to corresponding beams 87 extending crosswise to the mold 13 and parallel to the beams 40 supporting the jacks 49 and 50.

The actuators 47, 48 and the cylindrical rods 51 form together means for mounting and connecting the cover 23 to the cage-like structure 16.

The jacks 49 of the actuator 47 are driven by an electric motor 53 through a reduction gear and a conventional drive, known per se, including a shaft 54 and a gear train, not shown.

In quite a similar manner, the jacks 50 of the actuator 48 are driven by an electric motor 55 through a reduction gear and a conventional drive, also known per se, including a shaft 56 and a gear train, not shown.

According to the invention, the actuators 47, 48 constitute respective means for positioning in an adjustable manner each of the independent segments 23*a*, 23*b* of the cover 23, toward and away from the bottom wall 22 of the mold 13, so as to regulate in an independent and substantially continuous manner the height of each of the forming and stabilization chambers 13*a*, 13*b* of the mold.

In other words, the segments 23*a* and 23*b* of the cover 23 may be independently and adjustably positioned by means of the actuators 47 and 48, toward and away from the bottom wall 22, to independently regulate in a substantially continuous manner the height of the molding seat 44 of the central body 3 of the element 2.

Preferably, the height of the central body 3 of the continuous element 2 may be varied between 50 and 320 mm; the maximum range of adjustment is instead of about 160 mm.

In a preferred embodiment of the invention, the apparatus 1 further comprises means for clamping together the independent segments 23*a*, 23*b* of the cover 23 so as to provide, during the molding operations, an adequately fluid-tight seal of the cover 23 against leakage of the process fluids (steam, cooling water and compressed air) employed.

Figure 7:
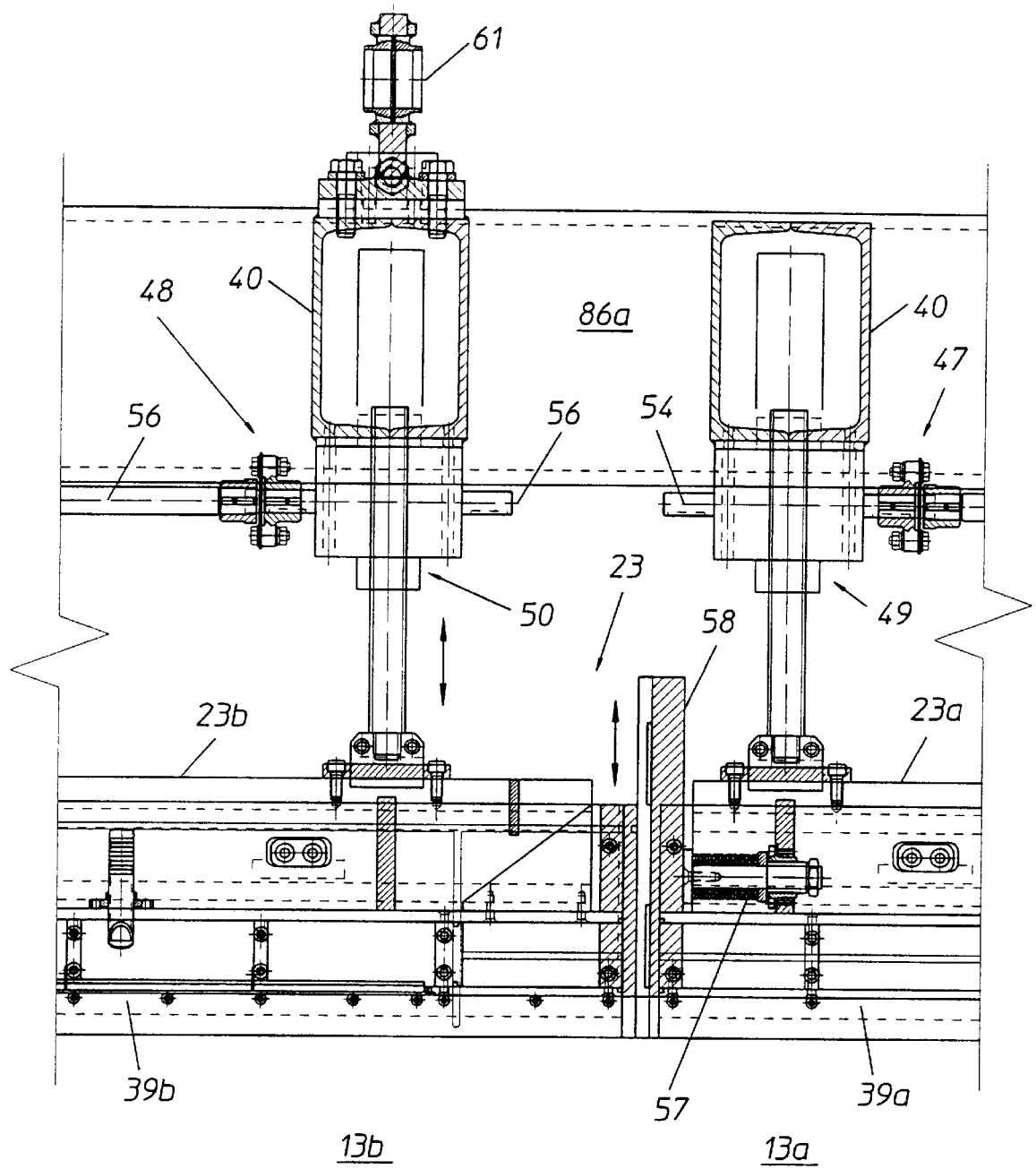
FIGS. 7 and 8 are enlarged lateral elevation views, partly in longitudinal cross section, respectively showing certain details of the mold cover of the apparatus of FIG. 1 in different operating condition thereof.
Figure 8:
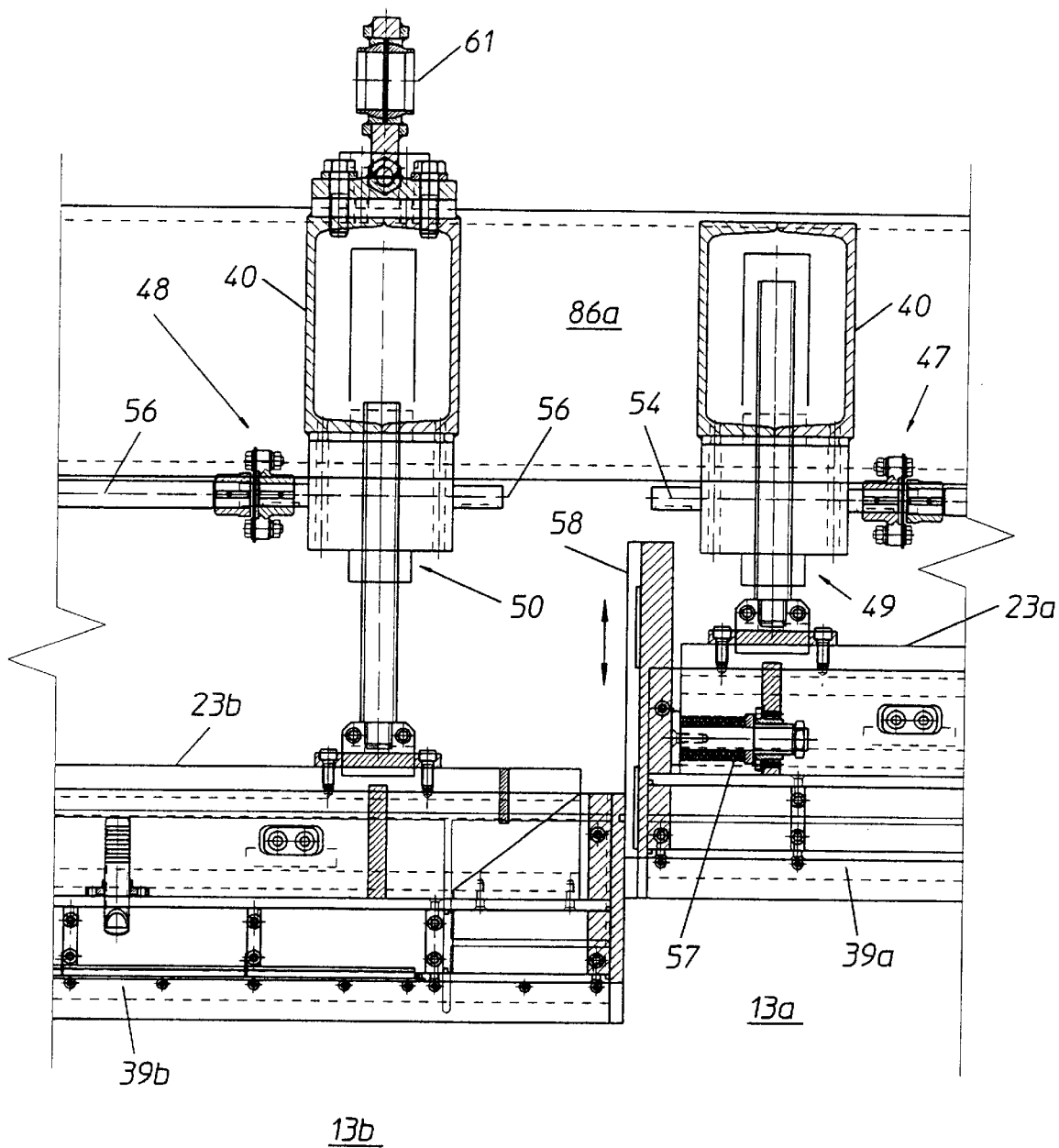

In the embodiment shown, such means comprises a plurality of Belleville washers 57, known per se, which are supported by the rear segment 23*a* of the cover 23 above the chamber 39*a* (FIGS. 7 and 8).

Advantageously, the Belleville washers 57 exert a constant and uniform pressure against the segment 23*b*, thereby ensuring the structural and functional continuity of the cover 23.

A sealing plate 58, fixed to an end wall of the segment 23*a*, provides an adequate fluid-tight seal between the adjacent segments of the cover 23.

Preferably, the outer surface of the sealing plate 58 is lined with a suitable self-lubricating material, such as polytetrafluoroethylene, so as to facilitate the sliding movements of the segments 23*a* and 23*b* relative to each other along the vertical direction and to preserve the surface integrity of the segment side walls held in constant mutual contact.

In the apparatus of the shown example, each of the side walls 20, 21 of the mold 13 is respectively slidably supported by a pair of parallel girders 30–31 and 32–33 longitudinally extending along the whole length of the mold (FIGS. 3 and 4).

More particularly, each of the segments 20*a,b* and 21*a,b* of the side walls is independently slidably supported by the girders 30–31 and 32–33 by means of respective positioning devices, indicated by references 34a,b and 35a,b which will be described in greater detail hereinafter.

The girders 30 and 31, supporting and stiffening the side wall 20, are conventionally fixed to three substantially L-shaped arms 59 which are pitchwise spaced from one another and supported by the beams 40, onto which they are pivotally connected by means of respective hinges having horizontal axis collectively denoted by 61 (FIGS. 3 and 4).

The hinges 61 comprise respective pins 62 engaged in corresponding eyes 63 extending in spaced relationship from the beam 40.

Accordingly, the pins 62 of the hinges 61 define a pivot axis about which the side wall 20 is rotatably mounted by the action of the opening device 29a including the double-acting cylinders 27.

Likewise, the opposite side wall 21 of the mold 13 is provided with an identical opening device 29b arranged in mirror-image relationship about a longitudinal plane of symmetry of the apparatus 1.

This device 29b comprises three arms 64 and three hinges 65 provided with pins 66 engaged in corresponding eyes 67 extending in spaced relationship and supported by the same beams 40.

The arms 64 of the device 29b are driven by double-acting hydraulic cylinders 28 supported by the supporting beams 26 at mirror-image positions with respect to the cylinders 27 of the device 29a.

In a manner known per se, each of said cylinders 27, 28 comprises a piston rod having an eye-shaped free end engaged by a respective pin 69, 70 of predetermined length, conventionally mounted at a free end of the arms 59 and 64.

Preferably, the apparatus 1 further comprises means for positioning in an adjustable manner, along a substantially vertical direction, each of the independent segments of the side walls 20, 21 toward and away from the bottom wall 22 of the mold 13, so as to independently regulate, in a substantially continuous manner, the height of the molding seats 45, 46 defined in the forming and stabilization chambers 13a, 13b of the mold.

In each of the side wall segments, such means are essentially constituted by the aforementioned actuating and adjusting devices 34a,b and 35a,b.

For simplicity, only the devices 34a, 34b provided for adjustably positioning the segments 20a and 20b of the side wall 20 will be described hereinafter (FIGS. 6 and 9–13).

In the embodiment shown, the devices 34a, 34b comprise three jacks, denoted by the references 73 and 74, each supported by the girder 31.

These jacks are pitchwise spaced from one another so as to ensure an adequate parallelism of upward/downward motion of each of the segments 20a, 20b of the side wall 20. The jacks 73 of the actuator 34a are driven by an electric motor 75 through a reduction gear and a conventional drive including a shaft 76 and a gear train, not shown.

Likewise, the jacks 74 of the actuating and adjusting device 34b are driven by an electric motor 77 through a reduction gear and a conventional drive including a shaft 78 and a gear train, not shown.

In this way, the actuating and adjusting devices 34a, 34b may independently regulate, in a substantially continuous manner, the height of the molding seat 46 of the lateral projection 6 of the element 2.

Preferably, the height of the lateral projection 6 (and of the oppositely located projection 5) of the element 2 may be varied between 20 and 80 mm; the maximum range of adjustment is instead of about 60 mm.

Each of the jacks 73—shown in greater detail in FIGS. 9 and 10—comprises a shaft 79 rotatably supported by the girders 30 and 31 by means of a pair of bearings 83, 84, the shaft being driven by the shaft 76 with the interposition of a conventional transmission member 80.

A movable assembly 81 fixed to the corresponding segment of the side wall 20 in a manner known per se, such as by means of a plurality of screw bolts 82, is displaced by the shaft 79, to which it is threadably engaged at a threaded central portion thereof.

Thus, a vertical displacement of the movable assembly 81 and, along therewith, of the side wall segment attached thereto corresponds to each rotation of the shaft 79.

Preferably, the apparatus 1 of the invention further comprises means for clamping together the independent segments of the side walls 20 and 21 in order to ensure an adequately fluid-tight seal of the side walls during the molding operations.

For the sake of simplicity, only the means for clamping together the independent segments 20a, 20b of the side wall 20, structurally and functionally identical with the means provided for on the opposite side wall 21, will be described hereinbelow.

In the embodiment shown, such means comprises a plurality of Belleville washers 60, known per se, supported by the front segment 20b of the side wall 20.

Advantageously, the Belleville washers 60 apply a constant and uniform pressure to the segment 20b, so as to constantly hold it against its adjacent segment 20a and provide a structural continuity of the wall 20.

To this end, each of the Belleville washers 60 is interposed between a perforated plate 88 fixed to the segment 20b and a flat washer 89 retained by means of a snap ring 91 on one end 90b of a pin 90 whose opposite end 90a abuts against a plate fixed to the segment 20a.

In order to allow for the relative displacement movements of the segments 20a, 20b along the vertical direction driven by the actuators 34a and 34b, each pin 90 is slidably guided within a respective slot 92 formed at one end of the rear segment 20b of the wall 20.

Advantageously, a sealing plate 93, fixed to one end of the rear segment 20a, ensures an adequate fluid-tight seal of the adjacent segments of the side wall 20.

Preferably, the outer surface of the sealing plate 93 is lined with a suitable self-lubricating material, such as polytetrafluoroethylene, so as to facilitate the relative sliding movements 20b along the vertical direction of the segments 20a and preserve at the same time the integrity of the lateral surfaces of the segments constantly held in mutual contact.

In a preferred embodiment of the invention, a plurality of substantially tubular plungers 94, having coplanar parallel axes, are supported within the mold 13 to form the cavities 4 provided within the body 3 to lighten the continuous element 2 to be manufactured.

The plungers 94, having a length substantially equal to the length of the mold 13, are mounted in cantilever fashion onto a movable head, known per se and not shown, and may be extracted from or inserted into the mold 13 by means of a conventional extraction device 95.

In the example shown, the extraction device 95 of the plungers 94 basically comprises said movable head and a pair of hydraulic cylinders 97, having coplanar parallel axes and being positioned on opposite sides of a plane y—y of longitudinal symmetry of the apparatus 1.

Figure 13:
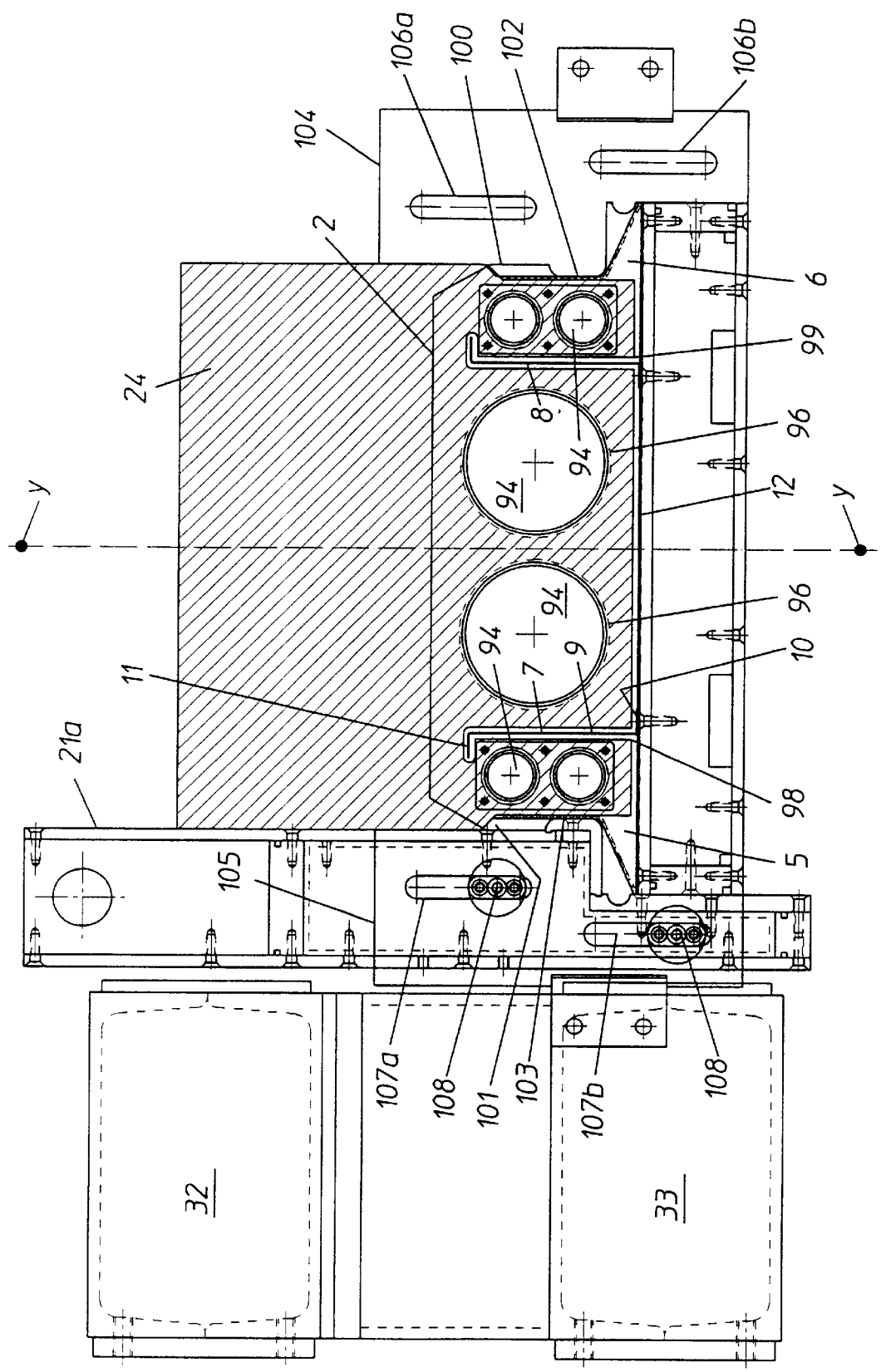
FIG. 13 is an enlarged view, partly in transversal cross-section, of certain details of the mold closure plate of the apparatus of FIG. 1.

The plungers 94 are slidably mounted in a corresponding plurality of parallel openings 96 formed both through the vertical closure plate 24 of the mold 13 and through the movable head supporting the plungers (FIGS. 13 and 14).

Furthermore, a chamber (not shown) adapted to feed the heating and cooling fluids in proper sequence into the mold 13 and having the same length as the forming chamber 13a of the mold is defined in an initial portion of each of said plungers 94, in quite the same manner as the side walls 20 and 21, bottom wall 22, and cover 23 of the mold 13.

In particular, these fluids are fed within each molding plunger 94 through suitable conduits, known per se and not shown.

Advantageously, the closure plate 24 of the mold 13 is provided with a pair of substantially L-shaped openings 98, 99 adapted to allow the introduction into the mold of the central portion 9 and upper fin 11 of the reinforcing sectional members 7 and 8.

The closure plate 24 is also laterally provided, at opposite sides thereof, with grooves 100, 101 adapted to abut against corresponding protrusions 102, 103 of mating shape which are formed on respective closure plates 104, 105, respectively attached to the bottom girders 31 and 33 supporting the segments 20a and 21a of the side walls 20, 21 (FIGS. 13 and 14).

In this way, it is advantageously possible to ensure a fluid-tight closure of the mold 13 at the inlet zones of the lath 12 into the mold.

Advantageously, moreover, each of the closure plates 104, 105 is provided with a pair of slots 106a,b and 107a,b designed to constitute respective guides for the sliding movements, along a vertical direction, of a plurality of pins extending from the segments 20a and 21a of the side walls 20 and 21.

In this way, a proper parallelism of vertical sliding movement of the rear segments 20a, 21a of the walls 20 and 21 is further assured.

In the accompanying FIGS. 13 and 14, only the pins extending from the segment 21a, collectively denoted by reference 108, are shown.

The apparatus 1 described hereinabove operates as follows.

In an initial operating condition, shown in FIGS. 1–3, the side walls 20, 21 and the cover 23 of the mold 13 are positioned at a preset distance from the bottom wall 22, while a segment of the continuous element 2 formed during a previous molding cycle shuts the outlet end of the stabilization chamber 13b of the mold 13.

In this condition, the molding seat 44 adapted to form the central body 3 and the molding seats 45, 46 adapted to form the projections 5 and 6 of a new segment of the continuous element 2 having indefinite length to be manufactured are defined inside the forming chamber 13a of the mold 13.

When the apparatus 1 is in this operating condition, a predetermined amount of expandible plastics in the form of granules, e.g. of pre-expanded polystyrene, is loaded into the forming chamber 13a through a plurality of conduits and injection devices, known per se and not shown.

Once the molding seats 44–46 defined inside the forming chamber 13a are completely filled, conventional operations for expanding and welding together the plastics granules, and for stabilizing the resulting segment of the element 2, are carried out by sequentially delivering steam and cooling water inside the mold and within said molding seats, creating a vacuum therein and then delivering compressed air.

More specifically, said fluids are delivered (or sucked) into the chambers 36a,b–39a,b of the side walls 20 and 21, bottom wall 22 and cover 23 of the mold 13, as well as into the chambers defined within the plungers 94, and then transferred into the molding seats through the slits 41.

During the molding operations of a new segment of the continuous element 2, a simultaneous welding of the same to the adjacent segment molded during a previous forming cycle of the apparatus 1 and housed in the stabilization chamber 13b of the mold 13 takes place.

The molding operations yield a substantially continuous element 2 which extends unbroken along the full length of the mold 13.

Once this element 2 has been stabilized, the mold 13 is opened by moving the side walls 20, 21 and cover 23 away from the bottom wall 22.

Specifically, the mold is opened by means of the hydraulic cylinders 27 and 28 of the opening devices 29a, 29b of the opposite side walls 20 and 21, and by the jacks 49 and 50 of the opening and adjusting devices 47 and 48 of the segments 23a and 23b of the cover 23 (FIG. 4).

Thanks to the presence of the hinges 61 and 65, the side walls 20 and 21 are substantially lap-opened away from the continuous element 2.

Once the mold 13 has been opened, the plungers 94 are partially extracted out of the cavities 4 that they formed inside the element 2 by means of the extraction device 95.

In particular, this partial extraction is carried out by means of a rearward movement actuated by the hydraulic cylinders 97 of the movable head that supports the plungers 94.

It should be noted that, upon completion of the rearward movement of the movable head, the plungers 94 are extracted out of the element 2 for a portion which has substantially the same length of the stabilization chamber 13b of the mold 13.

At the end of this partial extraction of the plungers 94, the hydraulic cylinders 97 are again operated to return the plungers and their supporting head back to their original position.

Concurrently with the insertion of the plungers 94 into the forming chamber 13a, suitable feeding devices, known per se and not shown, feed the reinforcing sectional members 7, 8 and the lath 12 into the forming chamber 13a of the mold 13.

Advantageously, the feeding movement of the reinforcing sectional members 7, 8 and of the lath 12 is guided by the openings 98, 99 defined through the closure plate 24 and, respectively, by a narrow gap defined between the closure plate 24 and the segment 22a of the bottom wall 22 (FIGS. 13 and 14).

Advantageously, moreover, the plungers 94 also apply, during their return stroke towards the mold 13, a pushing action to the element 2 which effectively contributes to displace the element 2 toward the stabilization chamber 13b of the mold 13.

The friction between the outer surface of the plungers 94 and the inner walls of the cavities 4 formed inside the element 2, in fact, contributes to overcome the frictional resistance which develops during the sliding movement of the element 2 on the bottom wall 22 of the mold.

Once the plungers are back in position, the side walls 20, 21 and the cover 23 are again closed onto the bottom wall 22 of the mold 13, as shown in FIG. 3.

In this configuration, the apparatus 1 is ready for a new molding cycle to form a further segment of the continuous element 2.

According to the invention, the height of the central body 3 and/or of one or both of the lateral projections 5, 6 of the element 2 may be regulated in an independent and substantially continuous manner by adjustably positioning each of the segments which constitute the side walls 20, 21 and the cover 23.

This regulation is carried out, in particular, by means of the devices 34a or 34b for the side wall 20, the corresponding devices 35a, 35b (not shown in detail for simplicity, but quite identical) provided for the opposite side wall 21, and by the positioning and adjusting devices 47, 48 for the cover 23.

Advantageously, the desired height regulation of the central body 3 and/or of one or both of the lateral projections 5, 6 may be carried out—throughout the regulation range previously specified—within a cycle time, i.e. without removing the previously formed element 2 and without interrupting the operation of the apparatus 1.

Advantageously, moreover, said regulation may be carried out in a substantially continuous manner between minimum and maximum values chosen at the design stage, by operating the jacks 49, 50 for the cover 23, and the jacks 73, 74 for the side wall 20, for example.

Since the jacks are drivingly interconnected, any vertical movement of the cover 23, and of one or both of the side walls 20, 21 takes place while assuring a constant parallelism with respect to the bottom wall 22 of the mold 13.

Advantageously, moreover, the height of the central body 3 and of the lateral projections 5, 6 may be regulated in a wholly independent manner for each of the independent segments of the side walls 20 and 21 and the cover 23, to readily and flexibly match even the most diversified production needs.

When the foamed plastics element 2 is, as in the present case, a continuous element intended for the construction of floors in residential buildings, the apparatus 1 allows to regulate in a most flexible manner both its load-bearing characteristics (by varying the height of the central body 3) and its thermal/acoustical insulation characteristics (by varying the height of the lateral projections 5, 6).

FIGS. 7 and 8 illustrate by way of example, a regulation of the cover 23 that may be carried out when a new continuous element 2 with improved load-bearing properties, i.e. with a higher central body 3, is to be produced.

In this case, after having positioned the segment of the continuous element 2 molded during the previous molding cycle into the stabilization chamber 13b, the segment 23a of the cover 23 is raised up to the desired amount by means of the jacks 49 of the actuator 47 (FIG. 8).

In the new configuration thus obtained, the side wall of the segment 23b provides an abutment member adapted to close the forming chamber 13a at the front, while the Belleville washers 57 will ensure a fluid-tight seal by clamping together the segments that make up the cover 23.

After molding the first segment of the new continuous element 2, the segment 23b of the cover 23 is also raised to the same height as the segment 23a by means of the jacks 50 of the actuator 48, thereby allowing the new continuous element 2 to move into the stabilization chamber 13b.

In quite a similar way, the height of the molding seat 44 of the body 3 may be reduced by first lowering the segment 23a in the first molding cycle of the new element 2, and then lowering the segment 23b of the cover 23 after extraction of the previously molded continuous element.

In this case, the abutment member adapted to close the forming chamber 13a at the front, now having a smaller height, is advantageously constituted by a portion of the previously molded continuous element 2 positioned in the stabilization chamber 13b.

As an example, FIGS. 9–12 illustrate the regulation of the side walls 20, 21 that may be made when a new continuous element 2 having enhanced thermal/acoustical insulation characteristics, i.e. higher lateral projections 5 and 6, is to be produced.

In this case, after having positioned the segment of the continuous element 2 molded during the previous molding cycle into the stabilization chamber 13b, the segments 20a, 21a of the side walls 20 and 21 are raised up to the desired amount by means of the jacks of the actuators 34a and 35a.

Figure 12:
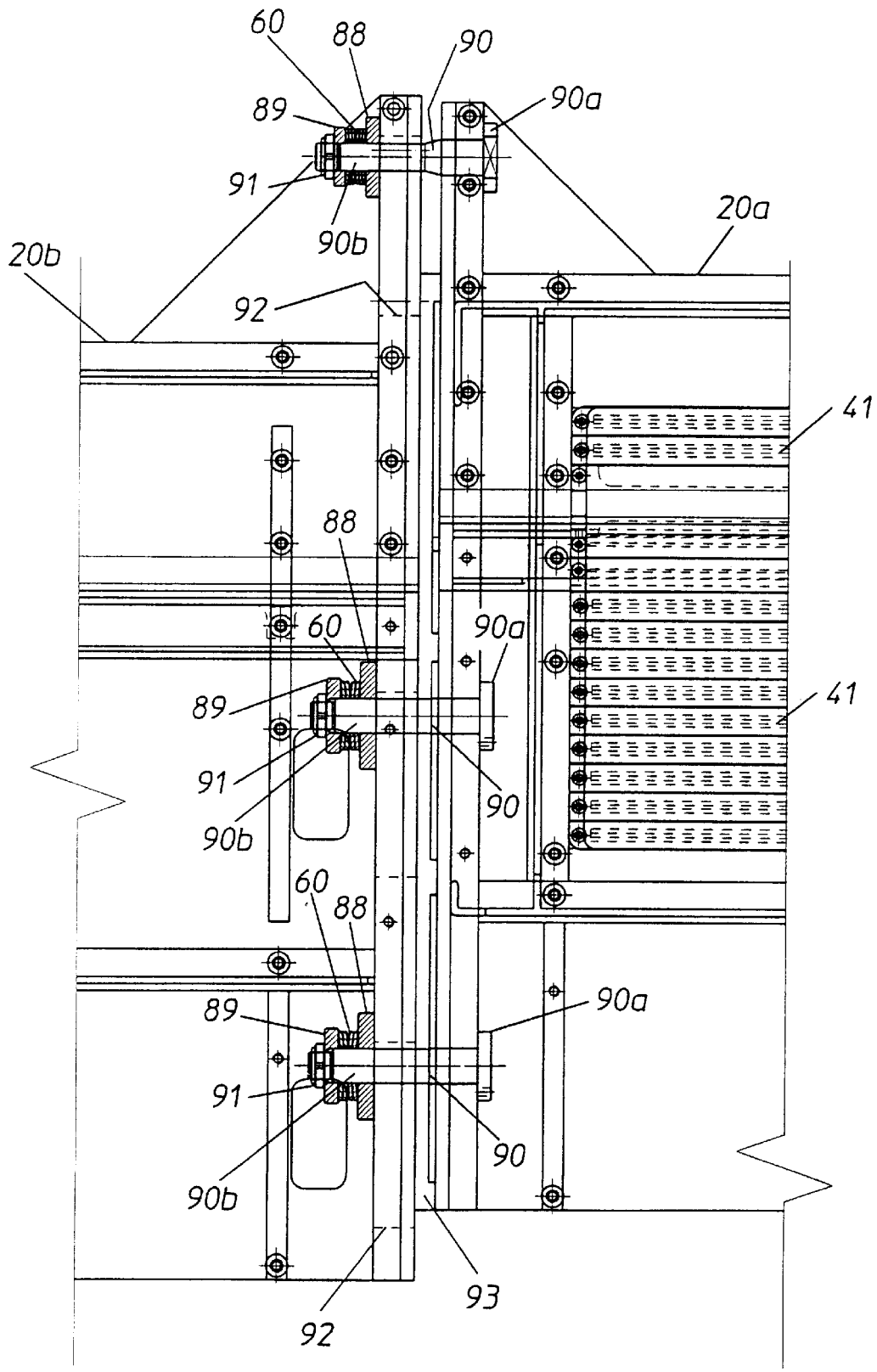

In the new configuration thus obtained, shown in FIGS. 10 and 12, the side walls of the segments 20b and 21b constitute as many abutment members adapted to close the forming chamber 13a at the front, while the Belleville washers 60 will ensure a fluid-tight seal by clamping together the segments that make up each of the side walls 20 and 21.

After having molded the first segment of the new continuous element 2, the segments 20b, 21b of the side walls 20, 21 are also raised to the same height as the segments 20a, 21a by means of the jacks of the actuators 34b, 35b, thereby allowing the new continuous element 2 to move into the stabilization chamber 13b.

In quite a similar way, the height of the molding seats 45, 46 of the lateral projections 5, 6 may be reduced by first lowering the segments 20a, 21a in the first molding cycle of the new element 2, and then lowering the segments 20b, 21b of the side walls 20, 21 after extraction of the previously molded continuous element.

In this case, the abutment members adapted to close the forming chamber 13a at the front, at the molding seats 45 and 46, now having a smaller height, are advantageously constituted by opposite portions of the lateral projections 5, 6 of the previously molded continuous element 2 positioned in the stabilization chamber 13b.

Clearly, this height regulation of the projections 5 and 6 may be effected either in combination with the height regulation of the central body 3 described above, or for only one of them, in this case by operating the positioning device of the respective side wall.

Advantageously, the side walls 20, 21, the bottom wall 22, and the cover 23 of the mold 13 may be removably mounted onto the base 25 and girders 30–33.

In this way, the apparatus 1 of this invention allows these parts of the mold 13 to be readily replaced for others with different shapes, so as to produce continuous elements having the desired shape and size.

Obviously, those skilled in the art may introduce variants and modifications to the above described invention, in order to satisfy specific and contingent requirements, variants and modifications which fall anyhow within the scope of protection as is defined in the following claims.

What is claimed is:

1. An apparatus for molding a continuous foamed plastics element, comprising a mold including
   i) a bottom wall, a pair of opposite side walls, and a cover;
   ii) a forming chamber and a stabilization chamber of said continuous element, said chambers being defined inside the mold between said side walls, said bottom wall and said cover;

said cover comprises a plurality of structurally independent segments clamped together by clamping means supported by one structurally independent segment of the plurality of structurally independent segments of the cover, and means being provided for positioning in an adjustable manner each of said independent segments of the cover toward and away from the bottom wall of the mold so as to regulate in a completely independent, adjustable and substantially continuous manner the height of the forming and stabilization chambers with respect to one another.

2. Apparatus according to claim 1, wherein said cover comprises a pair of segments longitudinally spanning along the full length of the forming chamber and, respectively, of the stabilization chamber of the mold.

3. Apparatus according to claim 1, wherein said means for positioning in an adjustable manner each of the independent segments of said cover comprises at least one jack provided with respective motor means.

4. Apparatus according to claim 1, further comprising means for clamping together said independent segments of the cover.

5. Apparatus according to claim 4, wherein said means for clamping comprises a plurality of Belleville washers supported by one structurally independent segment of the plurality of structurally independent segments of the cover.

6. Apparatus according to claim 1, further comprising a sealing plate interposed between said independent segments of the cover.

7. Apparatus according to claim 6, wherein the outer surface of said sealing plate is lined with a suitable self-lubricating material.

8. Apparatus for molding a continuous foamed plastics element of the type comprising a substantially parallelepipedic central body and at least one projection laterally and longitudinally extending from said body, said apparatus including a mold comprising:

i) a bottom wall, a plurality of opposite side walls, and a cover;

ii) a forming chamber and a stabilization chamber of said continuous element, said chambers being defined inside the mold between said side walls, said bottom wall and said cover;

iii) a first molding seat of the central body of said continuous element defined within said forming and stabilization chambers of the mold;

iv) a second molding seat of said at least one lateral projection of the continuous element defined within the forming and stabilization chambers of the mold between a groove formed in at least one of said side walls and said bottom wall;

wherein said at least one side wall comprises a plurality of structurally independent segments means being provided for positioning in an adjustable manner each of the independent segments of said at least one side wall toward and away from the bottom wall of the mold so as to regulate in an independent, adjustable and substantially continuous manner the height of the second molding seat defined within said forming and stabilization chambers of the mold.

9. Apparatus according to claim 8, wherein said at least one side wall comprises a pair of segments extending along the entire length of the forming chamber and, respectively, of the stabilization chamber of the mold.

10. Apparatus according to claim 8, wherein said means for positioning in an adjustable manner each of the independent segments of said at least one side wall comprises at least one jack provided with respective motor means.

11. Apparatus according to claim 8, further comprising means for clamping together the independent segments of said at least one side wall of the mold.

12. Apparatus according to claim 11, wherein said means comprises a plurality of Belleville washers.

13. Apparatus according to claim 8, comprising a sealing plate interposed between said independent segments of said at least one side wall.

14. Apparatus according to claim 13, wherein the outer surface of said sealing plate is lined with a suitable self-lubricating material.

15. Apparatus for molding a continuous foamed plastics element of the type comprising a substantially parallelepipedic central body and at least one projection laterally and longitudinally extending from said body, said apparatus including a mold comprising:

i) a bottom wall, a plurality of opposite side walls, and a cover;

ii) a forming chamber and a stabilization chamber of said continuous element, said chambers being defined inside the mold between said side walls, said bottom wall and said cover;

iii) a first molding seat of the central body of said continuous element defined within said forming and stabilization chambers of the mold;

iv) a second molding seat of said at least one lateral projection of the continuous element defined within the forming and stabilization chambers of the mold between a groove formed in at least one of said side walls and said bottom wall;

wherein said cover and at least one of said side walls of the mold comprise a plurality of structurally independent segments, first and second means being provided for independently positioning in an adjustable manner each of the independent segments of the cover and of said at least one side wall toward and away from the bottom wall of the mold so as to regulate in an independent, adjustable and substantially continuous manner the height of said first molding seat and, respectively, of said second molding seat defined in said forming and stabilization chambers of the mold.

16. Apparatus according to claim 15, wherein said cover and said at least one side wall of the mold comprise a pair of structurally independent segments longitudinally spanning along the full length of the forming chamber and, respectively, of the stabilization chamber of the mold.

17. Apparatus according to claim 15, wherein said first means for positioning in an adjustable manner each of the independent segments of the cover comprises at least one jack provided with a respective motor means.

18. Apparatus according to claim 15, further comprising means for clamping together said independent segments of the cover.

19. Apparatus according to claim 18, wherein said means for clamping comprises a plurality of Belleville washers supported by one structurally independent segment of the structurally independent segments of the cover.

20. Apparatus according to claim 15, further comprising a sealing plate interposed between said independent segments of the cover.

21. Apparatus according to claim 20, wherein the outer surface of said sealing plate is lined with a suitable self-lubricating material.

22. Apparatus according to claim 15, wherein said second means for positioning in an adjustable manner each of the independent segments of said at least one side wall comprises at least one jack provided with respective motor means.

23. Apparatus according to claim 15, further comprising means for clamping together the independent segments of said at least one side wall of the mold.

24. Apparatus according to claim 23, wherein said means for clamping comprises a plurality of Belleville washers supported by one structurally independent segment of the cover.

25. Apparatus according to claim 15, comprising a sealing plate interposed between said independent segments of said at least one side wall.

26. Apparatus according to claim 25, wherein the outer surface of said sealing plate is lined with a suitable self-lubricating material.

27. Apparatus according to claim 15, further comprising a closure plate for said mold provided with suitably shaped openings for introducing into the forming chamber corresponding reinforcing sectional members of said continuous element.

28. Apparatus according to claim 15, wherein at least one of said side walls is slidably supported by a pair of respectively upper and lower girders.

29. Apparatus according to claim 28, further comprising a closure plate fixed to said lower supporting girder, means being provided for guiding the sliding movement in a vertical direction of said at least one side wall relative to said closure plate.

30. Apparatus according to claim 29, wherein said means comprises a plurality of pins fixed to said at least one side wall and guided for sliding movement in a respective plurality of slots formed in said closure plate.

31. Apparatus according to claim 29, wherein said closure plate comprises a protrusion cooperating in abutment relationship with a corresponding groove laterally formed in said closure plate of the mold.

* * * * *